(12) United States Patent
Mishra et al.

(10) Patent No.: US 11,348,280 B2
(45) Date of Patent: May 31, 2022

(54) METHOD AND COMPUTER READABLE MEDIUM FOR POSE ESTIMATION

(71) Applicant: SEIKO EPSON CORPORATION, Tokyo (JP)

(72) Inventors: Akshaya Mishra, Brampton (CA); Rouzbeh Maani, Toronto (CA)

(73) Assignee: SEIKO EPSON CORPORATION, Tokyo (JP)

( * ) Notice: Subject to any disclaimer, the term of this patent is extended or adjusted under 35 U.S.C. 154(b) by 215 days.

(21) Appl. No.: 16/751,617

(22) Filed: Jan. 24, 2020

(65) Prior Publication Data
US 2021/0233269 A1  Jul. 29, 2021

(51) Int. Cl.
G06T 7/73 (2017.01)
G06T 7/70 (2017.01)
G06T 7/55 (2017.01)
G06T 7/00 (2017.01)

(52) U.S. Cl.
CPC .............. *G06T 7/75* (2017.01); *G06T 7/0002* (2013.01); *G06T 7/55* (2017.01); *G06T 7/70* (2017.01)

(58) Field of Classification Search
CPC ........... G06T 7/75; G06T 7/55; G06T 7/0002; G06T 2207/30164; G06T 7/70–77
USPC ......................................................... 382/181
See application file for complete search history.

(56) References Cited

U.S. PATENT DOCUMENTS

| 10,366,276 B2 | 7/2019 | Levinshtein et al. |
| 2004/0019598 A1 | 1/2004 | Huang et al. |
| 2016/0292889 A1 | 10/2016 | Niwayama |
| 2018/0222058 A1 | 8/2018 | Mizobe et al. |
| 2019/0197196 A1 | 6/2019 | Yang et al. |
| 2020/0234466 A1 | 7/2020 | Holzer et al. |

OTHER PUBLICATIONS

Bugaev, Bogdan, Anton Kryshchenko, and Roman Belov. "Combining 3D Model Contour Energy and Keypoints for Object Tracking." European Conference on Computer Vision. Springer, Cham, 2018. (Year: 2018).*

Metropolis, Nicholas, et al. "Equation of state calculations by fast computing machines." The journal of chemical physics 21.6 (1953) : 1087-1092. (Year: 1953).*

Jan. 22, 2021 Office Action Issued in U.S. Patent Application No. 16/776,675.

Tan et al.; "Multi-Forest Tracker: A Chameleon in Tracking;" 2014 IEEE Conference on Computer Vision and Pattern Recognition (CVPR); pp. 1202-1209; 2014.

(Continued)

*Primary Examiner* — Geoffrey E Summers

(74) *Attorney, Agent, or Firm* — Oliff PLC

(57) ABSTRACT

A method for pose estimation includes receiving an image containing an object, a first pose of the object in the image, and 3D boundary features of a model corresponding to the object; computing a first pose confidence of the first pose based on the image, the 3D boundary features, and the first pose; perturbing the first pose to obtain a second pose; computing a second pose confidence of the second pose based on the image, the 3D boundary features, and the second pose; determining if the second pose confidence is greater than the first pose confidence, and; and outputting the second pose and the second pose confidence if the second pose confidence is greater than the first pose confidence.

10 Claims, 7 Drawing Sheets

(56) References Cited

OTHER PUBLICATIONS

Tan et al.; "Looking Beyond the Simple Scenarios: Combining Learners and Optimizers in 3D Temporal Tracking;" IEEE Transactions on Visualization and Computer Graphics; vol. 23; No. 11; pp. 2399-2409; Nov. 2017.
Tan et al.; "A Versatile Learning-based 3D Temporal Tracker: Scalable, Robust, Online;" International Conference on Computer Vision (ICCV); Santiago, Chile; pp. 693-701; Dec. 2015.
Rusu et al.; "Fast Point Feature Histograms (FPFH) for 3D Registration;" Robotics and Automation, 2009; ICRA '09 International Conference on IEEE; 2009.
Johnson et al.; "Using Spin Images for Efficient Object Recognition in Cluttered 3D Scenes;" IEEE Transactions on Pattern Analysis and Machine Intelligence; vol. 21; No. 5; pp. 433-449; May 1999.
Tombari et al.; "Unique Signatures of Histograms for Local Surface Description;" European Conference on Computer Vision; Springer; Bedin, Heidelberg; pp. 356-369; 2010.
Tan et al.; "6D Object Pose Estimation with Depth Images: A Seamless Approach for Robotic Interaction and Augmented Reality;" Technische Universitat München; pp. 1-4; Sep. 5, 2017.
Brachmann et al.; "Learning 6D Object Pose Estimation using 3D Object Coordinates;" pp. 1-16; 2014.

* cited by examiner

METHOD AND COMPUTER READABLE MEDIUM FOR POSE ESTIMATION

BACKGROUND

Technical Field

The present disclosure relates to a method and computer readable medium for pose estimation.

Related Art

In computer vision, some methods of Object Detection and Pose Estimation (ODPE) only use depth features to determine a pose. This type of approach uses a depth map generated using depth sensors. Other methods of ODPE use only RGB features to determine a pose. This type of approach determines edges of an object using RGB sensor data.

SUMMARY

Although using a depth map sometimes provides a robust and reliable measurement to estimate the pose of an object, this approach is limited when depth maps have missing depth information. For example, depth maps often have missing depth information near high curvature regions such as edges and corners. In other words, objects with a sharp edge and flat views are frequently confused with flat surfaces that are bin boundaries.

Edge based methods using RGB data can be negatively affected by shadows and illumination changes, as well as changes in contrast caused by differences in color of the object and a background. In addition, generating 2D image data from a 3D model is computationally expensive.

An aspect of this disclosure is to refine a coarsely estimated initial pose by using both depth features and RGB sensor data. A first aspect of this disclosure includes a non-transitory computer readable medium that embodies instructions that cause one or more processors to perform object detection, the method comprising (a) receiving an image containing an object, a first pose of the object in the image, and 3D boundary features of a model corresponding to the object; (b) computing a first pose confidence of the first pose based on the image, the 3D boundary features, and the first pose; (c) perturbing the first pose to obtain a second pose; (d) computing a second pose confidence of the second pose based on the image, the 3D boundary features, and the second pose; (e) determining if the second pose confidence is greater than the first pose confidence; and (f) outputting the second pose and the second pose confidence if the second pose confidence is greater than the first pose confidence.

A second aspect of this disclosure further modifies the first aspect, wherein refining the second pose if the second pose confidence is greater than the first pose confidence.

A third aspect of this disclosure further modifies the second aspect, wherein refining the second pose includes perturbing the second pose based on how the first pose was perturbed in step (c).

A fourth aspect of this disclosure further modifies the first aspect, wherein computing the first pose confidence in step (b) and the second pose confidence in step (d) includes projecting the 3D boundary features onto a 2D space of the image, using the pose, to obtain 2D boundary features, generating a gradient map from the image, for each of the 2D boundary features, estimating an edge score for an area on the gradient map, the area being around a location of the 2D boundary feature, and generating the confidence score based on the estimated edge score.

A fifth aspect of this disclosure further modifies the first aspect, wherein computing the first pose confidence in step (b) and the second pose confidence in step (d) includes projecting the 3D boundary features onto a 2D space of the image, using the pose, to obtain 2D boundary features, generating a gradient map from the image, for each of the 2D boundary features, estimating an edge score for a plurality of areas having different scales on the gradient map, the plurality of areas being around a location of the 2D boundary feature, and generating the confidence score based on the estimated edge score.

A sixth aspect of this disclosure further modifies the first aspect, wherein the pose is stochastically perturbed in step (c).

A seventh aspect of this disclosure further modifies the first aspect, wherein the 3D boundary features include a set of 3D model contour feature points of a 3D model corresponding to the object, and the set of 3D model contour feature points are represented in a three-dimensional coordinate system; step (b) includes calculating a first set of 2D model contour points by projecting the set of 3D model contour feature points based on the first pose, the first set of 2D model contour points being represented in a two-dimensional coordinate system; and step (d) includes calculating a second set of 2D model contour points by projecting the set of 3D model contour feature points based on the second pose, the second set of 2D model contour points being represented in the two-dimensional coordinate system.

An eighth aspect of this disclosure further modifies the seventh aspect, wherein the pose confidence is calculated based on an estimated edge hypothesis in each of steps (b) and (d).

DETAILED DESCRIPTION OF EMBODIMENTS

Figure 1:
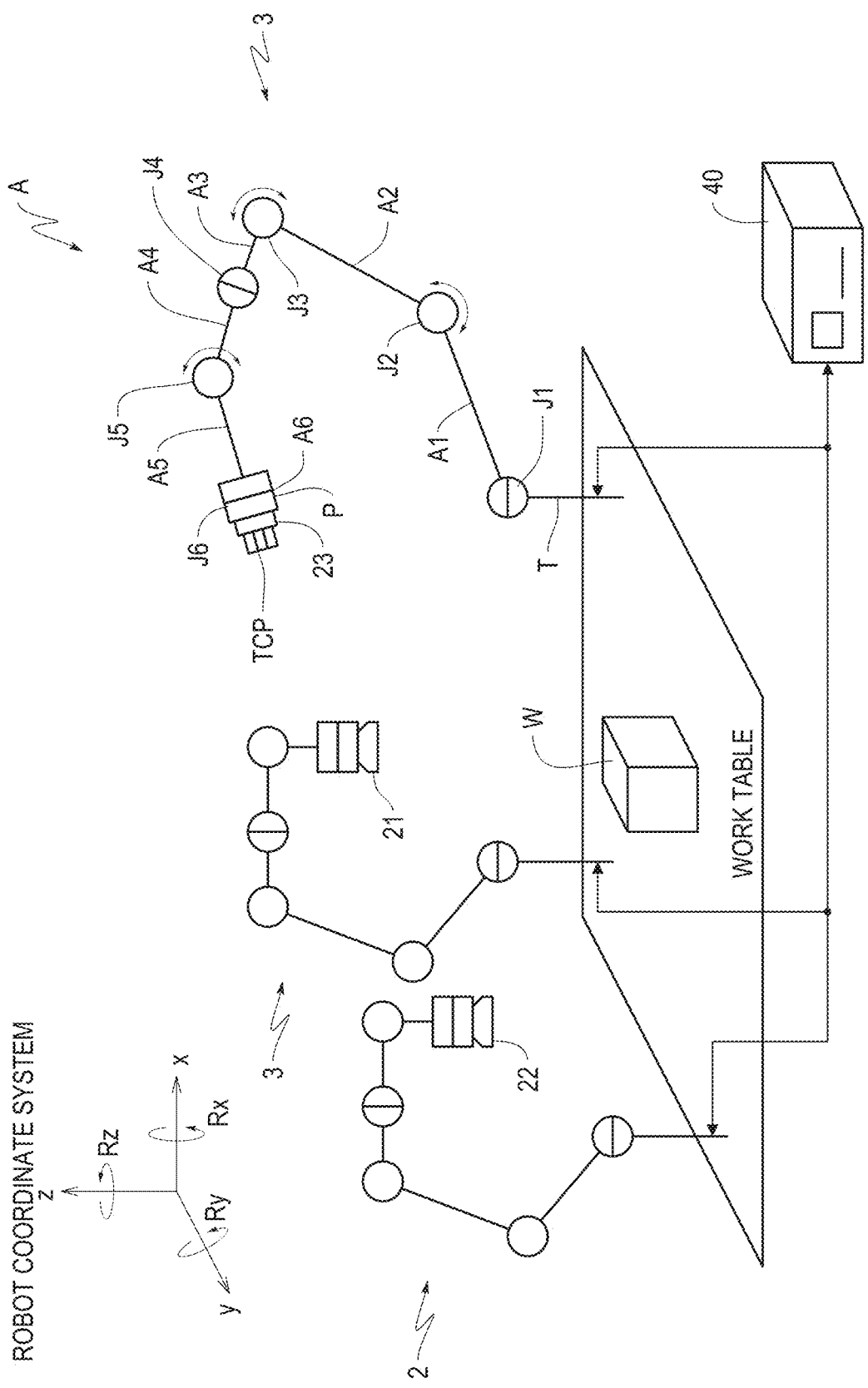
FIG. 1 is a perspective view of a robot system.

FIG. 1 is a perspective view illustrating a robot controlled by a control device according to an embodiment of the invention. A robot system in one example of the invention includes robots 1 to 3 as illustrated in FIG. 1. Each of the robots 1 to 3 is a six-axis robot including an end effector, and the different end effectors are attached to the robots 1 to 3. In other words, the robot 1 is attached with an imaging unit 21 (for example, an RGB stereo- or monocular-camera and a depth sensor, or an RGB-D sensor), the robot 2 is attached with an illumination unit 22 like an illuminator, and the robot 3 is attached with a gripper 23. Herein, the imaging unit 21 and the illumination unit 22 are referred to as an optical system.

The robots 1 to 3 are controlled by a control device 40. The control device 40 is communicably connected to the robots 1 to 3 via cables. A constituent element of the control device 40 may be provided in the robot 1. The control device 40 may be formed of a plurality of devices (for example, a learning unit and a control unit are provided in different devices). The control device 40 can be communicably connected to a teaching device (not illustrated) via a cable or wireless communication. The teaching device may be a dedicated computer, and may be a general purpose computer in which a program for teaching the robot 1 is installed. The control device 40 and the teaching device may be integrally formed with each other.

The robots 1 to 3 are single-arm robots of which various end effectors are attached to arms, and, in the present embodiment, configurations of the arms or axes of the robots 1 to 3 are equivalent to each other. In FIG. 1, reference signs for explaining arms or axes are added to the robot 3. As illustrated in the robot 3, each of the robots 1 to 3 includes a base T, six arm members A1 to A6, and six joints J1 to J6. The base T is fixed to a work table. The base T and the six arm members A1 to A6 are connected to each other via the joints J1 to J6. The arm members A1 to A6 and the end effectors are movable portions, and the movable portions are operated such that the robots 1 to 3 can perform various pieces of work.

In the present embodiment, the joints J2, J3 and J5 are bent joints, and the joints J1, J4 and J6 are torsional joints. The arm member A6 on the distal end side in the arm A is attached with a force sensor P and the end effector. Each of the robots 1 to 3 drives the arms of six axes such that the end effector is disposed at any position within a movable range, and can thus take any pose.

The end effector provided in the robot 3 is the gripper 23, and can grip a target object W. The end effector provided in the robot 2 is the illumination unit 22, and can illuminate an irradiation region with light. The end effector provided in the robot 1 is the imaging unit 21, and can capture an image within a visual field. In the present embodiment, a position which is relatively fixed with respect to the end effector of each of the robots 1 to 3 is defined as a tool center point (TCP). A position of the TCP is a reference position of the end effector, and a TCP coordinate system which has the TCP as the origin and is a three-dimensional orthogonal coordinate system relatively fixed with respect to the end effector is defined.

The force sensor P is a six-axis force detector. The force sensor P detects magnitudes of forces which are parallel to three detection axes orthogonal to each other, and magnitudes of torques about the three detection axes, in a sensor coordinate system which is a three-dimensional orthogonal coordinate system having a point on the force sensor as the origin. In the present embodiment, the six-axis robot is exemplified, but various aspects of robots may be used, and aspects of the robots 1 to 3 may be different from each other. Any one or more of the joints J1 to J5 other than the joint J6 may be provided with a force sensor as a force detector.

If a coordinate system for defining a space where the robots 1 to 3 are provided is referred to as a robot coordinate system, the robot coordinate system is a three-dimensional orthogonal coordinate system defined by an x axis and a y axis orthogonal to each other on a horizontal plane, and a z axis having a vertical upward as a positive direction (refer to FIG. 1). A negative direction of the z axis substantially matches the gravitational direction. A rotation angle about the x axis is indicated by Rx, a rotation angle about the y axis is indicated by Ry, and a rotation angle about the z axis is indicated by Rz. Any position in the three-dimensional space can be expressed by positions in the x, y and z directions, and any pose in the three-dimensional space can be expressed by rotation angles in the Rx, Ry and Rz directions. Hereinafter, the term pose indicates a position of an object, such as the target object W, in the x, y, z directions and an attitude of the object with respect to angles expressed in the Rx, Ry, and Rz directions.

In the present embodiment, relationships among various coordinate systems are defined in advance, and coordinate values in the various coordinate systems can be converted into each other.

Figure 2:
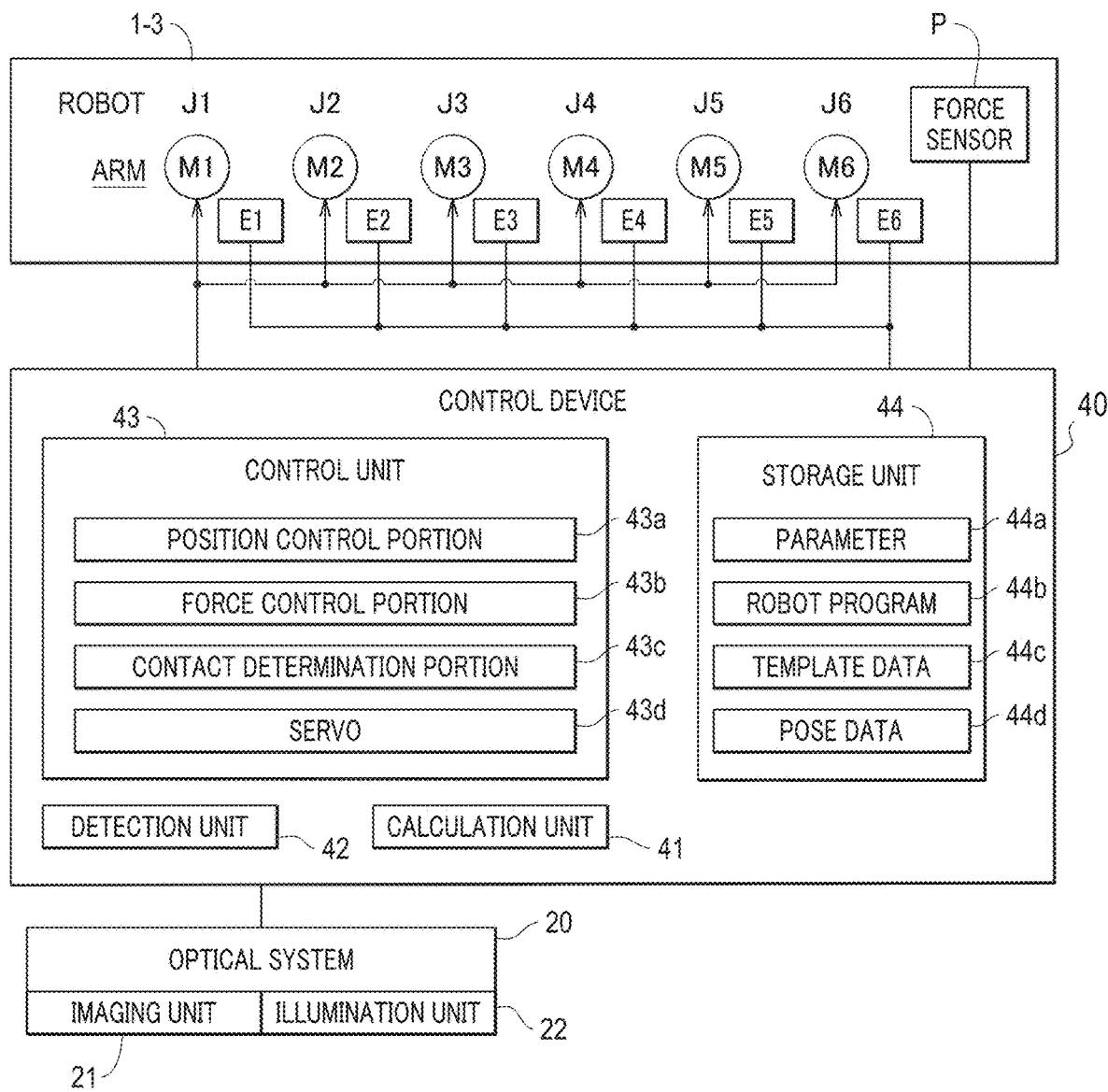
FIG. 2 is a functional block diagram of a control system and a robot.

As shown in FIG. 2, the robot 1 is a general purpose robot which can perform various pieces of work through teaching, and includes, motors M1 to M6 as actuators, and encoders E1 to E6 as sensors. Controlling the arms indicates controlling the motors M1 to M6. The motors M1 to M6 and the encoders E1 to E6 are provided to respectively correspond to the joints J1 to J6, and the encoders E1 to E6 respectively detect rotation angles of the motors M1 to M6. The respective motors M1 to M6 are connected to power lines for supplying power, and each of the power lines is provided with an ammeter. Therefore, the control device 40 can measure a current supplied to each of the motors M1 to M6.

The control device 40 includes hardware resources such as a computer and various software resources stored in a storage unit 44, and can execute a program. In the present embodiment, the control device 40 functions as a calculation unit 41, a detection unit 42, and a control unit 43. The hardware resources may include a processor like a CPU, a memory like a RAM, a ROM, and the like, and may include an ASIC, and various configurations may be employed. The storage unit 44 is a computer readable medium such as a flash memory, a solid-state memory, or a magnetic memory.

In the present embodiment, the detection unit 42 performs a process of detecting a target object W, and the control unit 43 drives the arms of the robots 1 to 3. The detection unit 42 is connected to the imaging unit 21 and the illumination unit 22 forming an optical system 20. The detection unit 42 controls the imaging unit 21, and acquires an image captured by an imaging sensor, such as an RGB-D sensor, provided in the imaging unit 21. The detection unit 42 controls the illumination unit 22, and changes brightness of output light.

If an image is output from the imaging unit 21, the detection unit 42 performs a template matching process on the basis of the captured image, and performs a process of detecting a relatively coarse position (pose) of a target object W. In other words, the detection unit 42 performs the template matching process on the basis of the template data 44c. Template data 44c is a template for each of a plurality of poses stored in the storage unit 44. Therefore, if a pose is correlated with an ID or the like with respect to the template data 44c, a pose of a target object W viewed from the detection unit 42 can be specified by using the appropriate type of template data 44c, as will be described in further detail below.

A position at which the illumination unit 22 is disposed when a target object W is imaged is defined as a position of the illumination unit, and is included in the illumination unit parameter. The illumination unit 22 includes a mechanism capable of adjusting brightness, and a value of brightness of when a target object W is imaged is included in the illumination unit parameter. A position of the illumination unit may also be described in various methods, and, for example, a configuration in which a position of the TCP of the illumination unit 22 is described in the robot coordinate system may be employed.

As described above, the detection unit 42 may operate the robot 1 or 2 by specifying a position of the imaging unit 21 or the illumination unit 22 on the basis of the optical parameters, but positions of when the robot 1 and the robot 2 are driven may be given by the operation parameters or the force control parameters.

In the present embodiment, the control unit 43 includes the position control portion 43*a*, a force control portion 43*b*, a contact determination portion 43*c*, and a servo 43*d*. In the control unit 43, a correspondence relationship U1 between a combination of rotation angles of the motors M1 to M6 and a position of the TCP in the robot coordinate system is stored in a storage medium, and a correspondence relationship U2 between the coordinate systems is stored in a storage medium. Therefore, the control unit 43 or the calculation unit 41 can convert a vector in any coordinate system into a vector in another coordinate system on the basis of the correspondence relationship U2. For example, the control unit 43 or the calculation unit 41 may acquire acting forces to the robots 1 to 3 in the sensor coordinate system on the basis of outputs from the force sensor P, and may convert the acting forces into forces acting on positions of the TCP in the robot coordinate system. The control unit 43 or the calculation unit 41 may convert a target force expressed in the force control coordinate system into a target force at a position of the TCP in the robot coordinate system. Of course, the correspondence relationships U1 and U2 may be stored in the storage unit 44.

The storage unit 44 stores a robot program 44*b* for controlling the robots 1 to 3 in addition to the parameters 44*a*. In the present embodiment, the parameters 44*a* and the robot program 44*b* are generated through teaching and are stored in the storage unit 44, but may be corrected by the calculation unit 41. The robot program 44*b* mainly indicates the sequence of work (an order of steps) performed by the robots 1 to 3, and is described by a combination of pre-defined commands. The parameters 44*a* are specific values which are required to realize each step, and are described as arguments of each command. The storage unit 44 also stores pose data 44*d* for determining a pose of the object W, as will be described below in further detail.

The parameters 44*a* for controlling the robots 1 to 3 include the operation parameters and the force control parameters in addition to the optical parameters. The operation parameters are parameters related to operations of the robots 1 to 3, and are parameters which are referred to during position control in the present embodiment. In other words, in the present embodiment, a series of work may be divided into a plurality of steps, and the parameters 44*a* of when each step is performed are generated through teaching. The operation parameters include parameters indicating a start point and an end point in the plurality of steps. The start point and the end point may be defined in various coordinate systems, and, in the present embodiment, the start point and the end point of the TCP of a control target robot are defined in the robot coordinate system. In other words, a translation position and a rotation position are defined for each axis of the robot coordinate system.

(1) Pose Estimation

Figure 3:
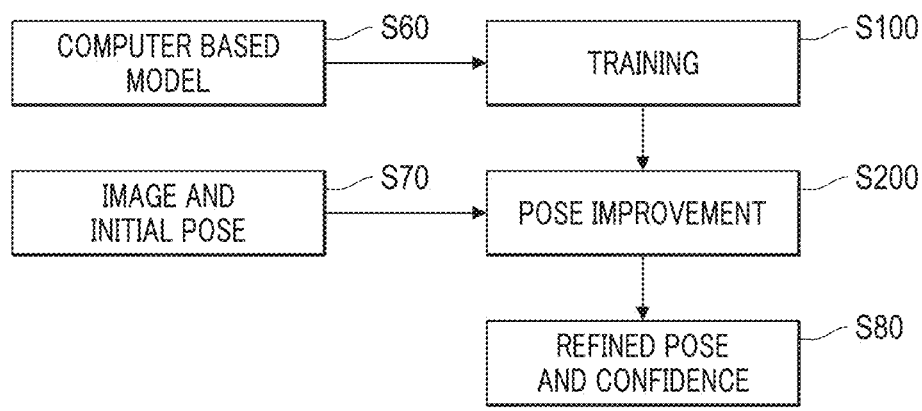
FIG. 3 is a flowchart of an exemplary method of pose estimation.

FIG. 3 shows an exemplary method for pose estimation according to this embodiment. In this embodiment, the method for pose estimation carried out by the control device 40. The method uses an RGB image of the object W as inputs. The method outputs a refined pose and confidence for use in determining the position and attitude of the object W. The computer model could be, for example, a CAD model of the object W.

(2) Training

The template data 44*c* is generated during training based on the input of a computer model, such as a CAD model, in S60 that is input to S100 for training, as shown in FIG. 3. S100 trains based on the computer model and then provides the data for use during pose improvement in S200. S100 outputs information including boundary features as a result of the training in S80. S70 images an object W and sends the image data, such as RGB image data, to the pose improvement of S200 with an initial pose of the object W. S200 refines the pose received from S70 based on the image data received from S70 and the trained data from S100. S200 is an example of a runtime portion of this embodiment. S100 is an example of a training portion of this embodiment. Additional details of the training process S100 are shown in FIG. 4.

Figure 4:
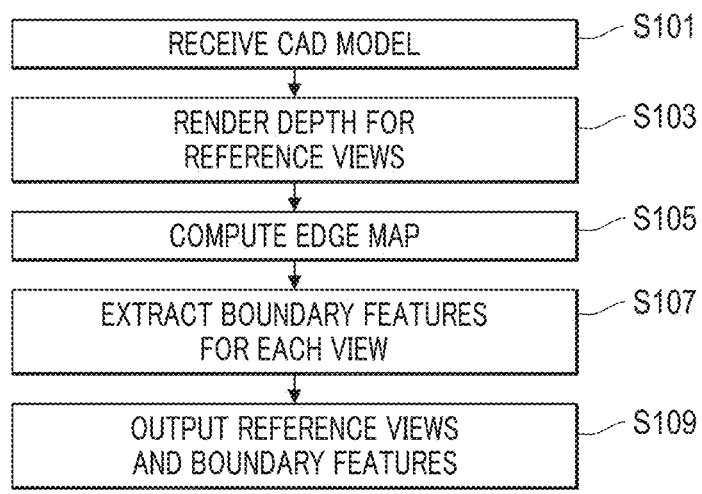
FIG. 4 is a flowchart of a method of generating template data.

In S101 of FIG. 4, the control device 40 receives a computer model, for example a CAD model, which defines a shape of the object W. The computer model represents the shape of the object W in three dimensions (e.g., a 3D model).

Figure 5A:
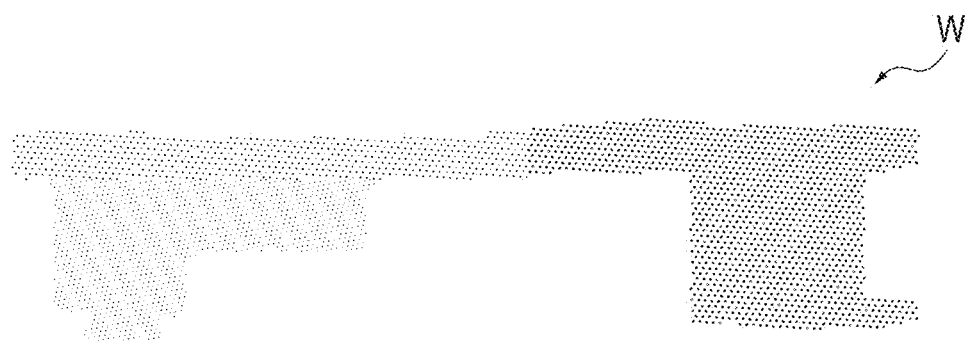
FIGS. 5A-5C are examples of steps for extracting boundary features.
Figure 5B:
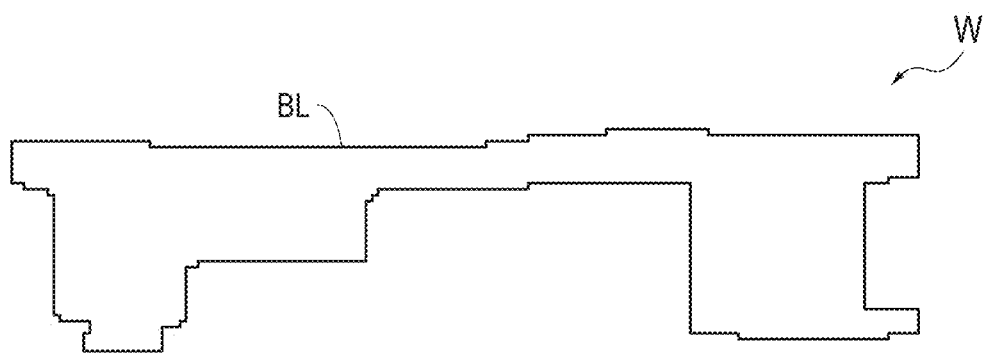

After receiving the computer model in S101, the control device 40 generates a rendered depth map for each of a plurality of views in S103 as shown for an exemplary view of the object W in FIG. 5A. Each view of the object W is from a unique angle. For each view, a multi-scale gradient map is created from the rendered depth map, and in this embodiment, the multi-scale gradient map includes edge maps at respective scales in a two-dimensional space as shown for an exemplary scale and a view of the object W in FIG. 5B. In some embodiments, for each view, the corresponding depth map can be a multi-scale gradient map.

Figure 5C:
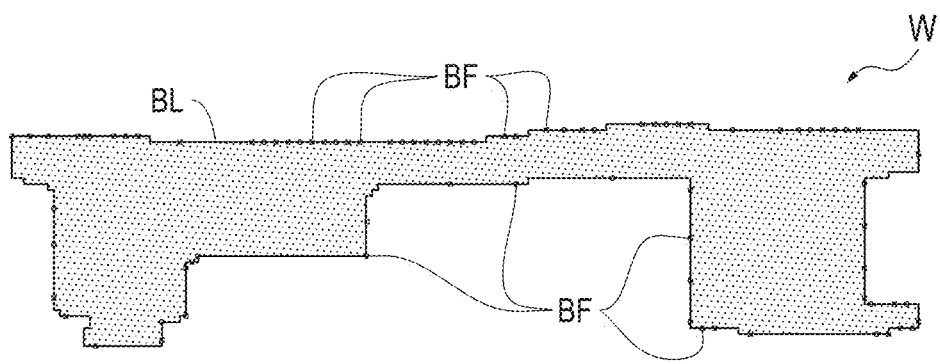

Next, in S105, the control device 40 learns to discriminate boundary locations BL, or edge feature locations, for each view based on the corresponding multi-scale gradient map as shown for an exemplary scale and a view of the object W in FIG. 5C. The boundary locations BL identify boundaries of the object W in each respective view. Based on the boundary locations BL for each view, a set of boundary features BF is determined in S107.

Each boundary feature BF is a point on a boundary, or an edge, location. The boundary features BF obtained for a view are then projected back to a three-dimensional coordinate system of the 3D model. These back-projected features having 3D coordinates may also be referred to as "3D boundary features" of the 3D model. Then the 3D boundary features are stored in a memory area together with, or associated with, their corresponding 2D coordinates ("2D boundary features") and the corresponding view for run time use. A plurality of the boundary features BF are shown for an exemplary view of the object W in FIG. 5C. The number of boundary features BF can be random, based on resolution of the imaging sensor, the processing power available, the memory available, or other factors as would be apparent in light of this disclosure. The boundary features BF are a set of model contour feature points of the computer model corresponding with the object W. The boundary features BF and the edge threshold for each view are examples of data stored in the parameters 44*a*. In addition, an edge threshold for each boundary feature for each view can be calculated in S107.

(3) Initial Pose

In S70, an image is captured by the optical unit 20, and an initial pose is calculated by the control device 40 based on the captured image. Specifically, the detection unit 42 sequentially sets the template data 44c for each of a plurality of poses as a processing target, and compares the template data 44c with the captured image while changing a size of the template data 44c. The detection unit 42 detects, as an image of the target object W, an image in which a difference between the template data 44c and the image is equal to or less than a threshold value. In this embodiment, the initial pose is defined in a 3D coordinate system of the camera or the rendering camera for rendering the 3D model onto the image plane of the camera.

If the image of the target object W is detected, the detection unit 42 specifies, or derives, a pose of the target object W on the basis of a size of the template data 44c appropriate for a relationship of a predefined coordinate system. In other words, a distance between the imaging unit 21 and the target object W in an optical axis direction is determined on the basis of the size of the template data 44c, and a position of the target object W in a direction perpendicular to the optical axis is determined on the basis of the position of the target object W detected in the image.

Therefore, for example, in a case where the optical axis of the imaging sensor of the imaging unit 21 and two axes of an imaging plane, for example u and v, are respectively defined to be parallel to the axes of the TCP coordinate system, the detection unit 42 can specify a position of the target object W in the TCP coordinate system on the basis of a size of the template data 44c, and a position where the template data 44c is appropriate for the image. The detection unit 42 may specify a pose of the target object W in the TCP coordinate system on the basis of an ID of the appropriate template data 44c. Thus, the detection unit 42 can specify a pose of the target object W in any coordinate system, for example the robot coordinate system, by using the correspondence relationship in the above coordinate system.

The template matching process may be a process for specifying a pose of a target object W, and may employ various processes. For example, a difference between the template data 44c and an image may be evaluated on the basis of a difference between grayscale values, and may be evaluated on the basis of a difference between features of the image (for example, gradients of the image).

The detection unit 42 performs the template matching process by referring to parameters. In other words, various parameters 44a are stored in the storage unit 44, and the parameters 44a include parameters related to detection in the detection unit 42.

The optical parameters are parameters related to detection in the detection unit 42. The operation parameters and the force control parameters are parameters related to control of the robots 1 to 3. The optical parameters include an imaging unit parameter related to the imaging unit 21, an illumination unit parameter related to the illumination unit 22, and an image processing parameter related to image processing on an image of a target object W captured by the imaging unit 21.

The imaging unit 21 includes a mechanism capable of adjusting an exposure time and an aperture, and an exposure time and a value of the aperture for imaging a target object W are included in the imaging unit parameter. A position of the imaging unit may be described in various methods, and, for example, a configuration in which a position of the TCP of the imaging unit 21 is described in the robot coordinate system may be employed.

The detection unit 42 sets an exposure time and an aperture of the imaging unit 21 by referring to the imaging unit parameter. As a result, the imaging unit 21 is brought into a state of performing imaging on the basis of the exposure time and the aperture. The detection unit 42 delivers a position of the illumination unit 22 to the position control portion 43a by referring to the imaging unit parameter. The detection unit 42 sets brightness in the illumination unit 22 by referring to the illumination unit parameter. As a result, the illumination unit 22 is brought into a state of outputting light with the brightness.

The detection unit 42 refers to the image processing parameter in a case where the template matching process is applied to an image captured by the imaging unit 21. In other words, the image processing parameter includes an image processing order indicating a processing sequence of performing the template matching process. In the present embodiment, a threshold value in the template matching process is variable, and a threshold value of the current template matching is included in the image processing parameter. The detection unit 42 may perform various processes before comparing the template data 44c with an image. A smoothing process and a sharpening process can include various processes, and the intensity of each thereof is included in the image processing parameter.

If an image is output from the imaging unit 21, the detection unit 42 determines an order of image processing (including whether or not the image processing is to be performed) on the basis of the image processing sequence, and performs image processing such as a smoothing process or a sharpening process in the order. In this case, the detection unit 42 performs image processing such as a smoothing process or a sharpening process according to the intensity described in the image processing parameter. In a case where comparison (comparison between the template data 44c and the image) included in the image processing sequence is performed, the comparison is performed on the basis of a threshold value indicated by the image processing parameter.

The template matching process roughly estimates an initial 3D pose based on an image captured by the camera, and in S70, provides the initial pose and the image captured by the camera to the pose improvement process of S200. The initial pose provided in S70 is a relatively coarse pose. In some embodiments, in S70, a detection algorithm is run by one or more processors in the detection unit 42. The detection algorithm can perform a template matching algorithm where 2D feature templates that have been generated based on a 3D model at various poses are used to estimate a 3D pose of the object W in a captured image by minimizing reprojection errors, over a trained view range.

(4) Runtime

Figure 6:
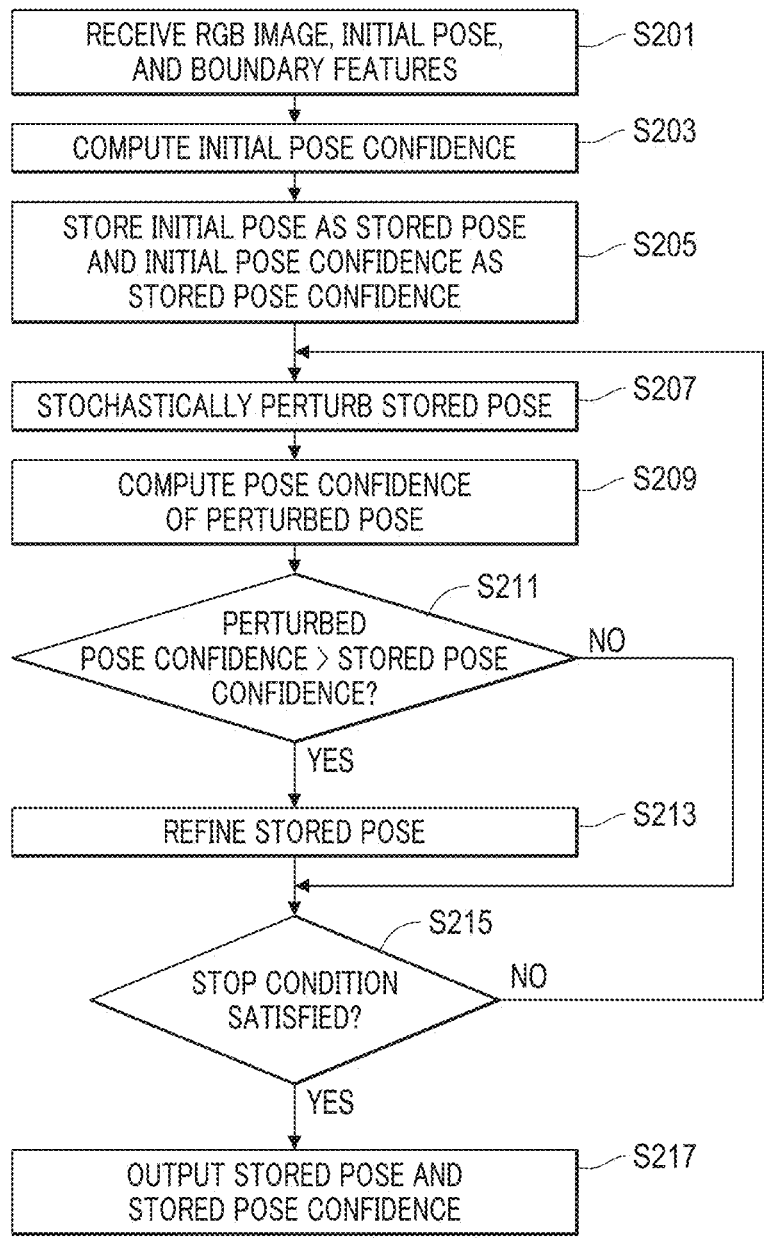
FIG. 6 is a flowchart of a method executed at runtime for pose estimation.

During runtime, a pose improvement process in S200 is run. FIG. 6 provides a pose improvement process S200 according to this embodiment. The image captured by the optical system, the associated initial pose, and boundary features included in the parameters 44a (templates including the 3D boundary features, the corresponding 2D boundary features and the corresponding views (or poses) determined during training) are received in S201.

Figure 8:
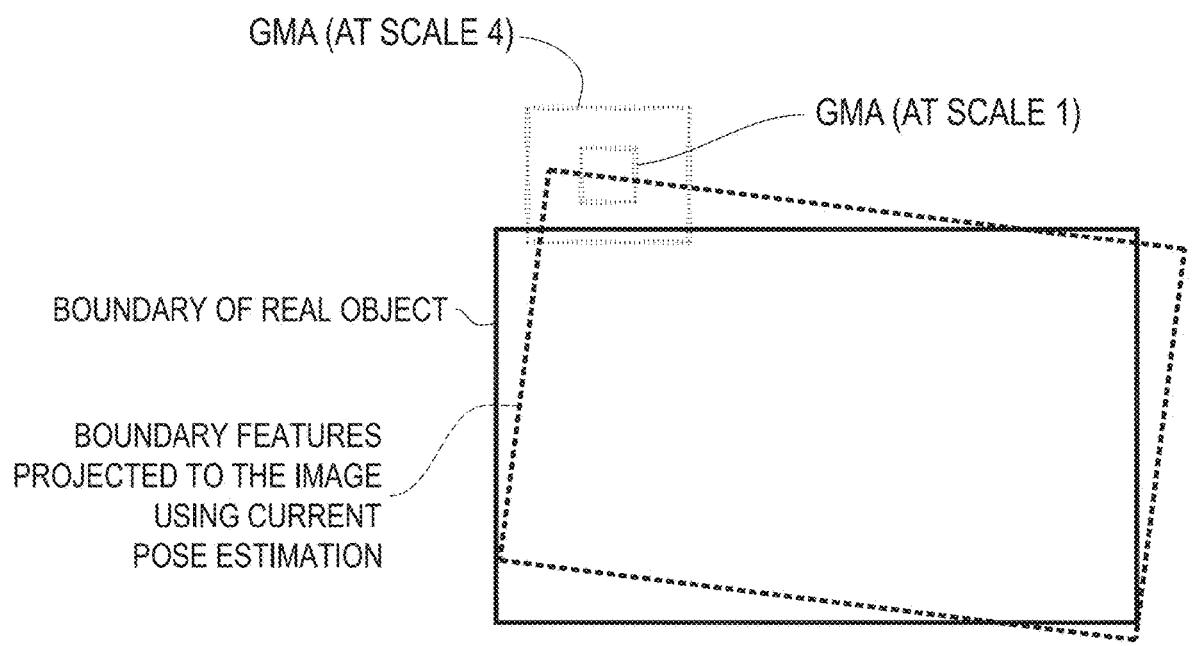
FIG. 8 is a diagram illustrating how an edge hypothesis is calculated.

Next, in S203, a pose confidence of the initial pose is calculated based on the 3D boundary features of the 3D model associated with a pose closest to the initial pose, and the image containing the object X captured by the optical system. The 3D boundary features are projected onto a 2D space, which is typically the same as the 2D coordinate system of the captured image, using the initial pose or the pose closest to the initial pose. In this embodiment, the initial pose or the pose closest to the initial pose may be referred to as a first pose. In this embodiment, for a pose confidence, at each (u, v) location of the projected boundary features in the 2D space, an edge hypothesis, or an edge score, is estimated for one or preferably more areas having different scales around a location (u, v). An example edge hypothesis, as shown in FIG. 8, illustrates edge hypotheses at scale 4 and at scale 1. The points that are on an actual edge will have the highest score. The score decreases as the location (u, v) is farther from an actual edge point.

Figure 7:
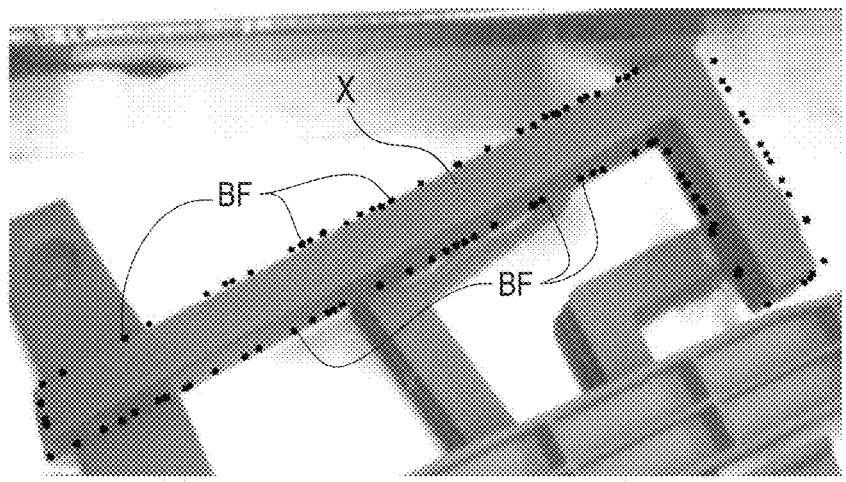
FIG. 7 is an example of a projection of a set of boundary points on a captured image.

The score for each location (u, v) of the boundary features of the 3D model can be computed as follows in S203. Once the closest model template $T_i$ corresponding to the pose closest to the given pose is found, then the 3D boundary features BF in the template $T_i$ are projected onto the image using the initial pose as shown in FIG. 7. In some embodiments, the pose closest to the initial pose may also be used to project the 3D boundary features onto the image. A variance map, or a gradient map, is generated from the image corresponding to the initial pose. Then, using the variance map, the edge strength g(k) of the input image at each projected boundary feature location (u, v) and a final edge score at location (u, v) are computed. For example, an edge score e(u, v) for estimating a pose confidence can be calculated based on the formula:

$$e(u, v) = \frac{1}{\sum_{k=0}^{n} \frac{1}{(2 \times (k+1)+1)^2}} \sum_{k=0}^{n} \frac{1}{(2 \times (k+1)+1)^2} h(g(k)),$$

$$h(x) = \begin{cases} 0 & \text{if } x < \theta \\ 1 & \text{if } x \geq \theta \end{cases}$$

Where g(k) is an edge strength which is based on gradient values in an area GMA ("gradient map area") of a gradient map obtained from the captured (real) image, the size of the area being based on a scale k, and the location of the area being centered at location (u, v).

The gradient values on all locations within the area GMA centered at (u, v) are added to obtain the edge strength or g(k). In this embodiment, e(u, v) is an edge score at pixel location (u, v). The variable n is a number that indicates the number of the areas GMA centered at (u, v) minus 1. The function h(x) is a step function in which the edge strength g(k) can be applied as a value x, and $\theta$ is an edge threshold. The edge threshold $\theta$ indicates a minimum edge strength for a given area GMA centered at (u, v). Thus, when an area GMA is too far from an edge, the edge strength g(k) is less than the edge threshold $\theta$, and the edge score e(u, v) is 0.

In this embodiment, the area is a rectangle that is defined by a height=2(k+1)+1 and a width=2(k+1)+1, with a center at (u, v). FIG. 8 illustrates two exemplary areas GMA, a first area GMA at a scale=1, and a second area GMA at a scale=4. At scale 1, meaning k=0, the size of the rectangle is (2×(0+1)+1)×(2×(0+1)+1)=3×3. At scale 4, meaning k=3, the size of the rectangle is (2×(3+1)+1)×(2×(3+1)+1)=9×9. When applied to the formula above, a scale of 1 would result in an edge score e(u, v) of $1/((2\times(0+1)+1)^2)\times 0$ when the number n of areas GMA is 1 (n=1) and the edge strength g(k) is less than the edge threshold $\theta$. At scale 4, meaning k=3, an edge score e(u, v) would be $1/((2\times(3+1)+1)^2)\times 1$ when the number n of areas GMA is 1 (n=1) and the edge strength g(k) is greater than or equal to the edge threshold $\theta$. Although two examples of the area GMA are illustrated in FIG. 8, any number of areas GMA and values of scale k can be used for calculating edge score e(u, v) at location (u, v).

While the current disclosure illustrates and describes the area GMA having a rectangular shape, it should be noted that the area GMA can have any shape.

Next, in S205, the pose confidence and the initial pose are stored as a stored pose confidence and a stored pose. The pose is further improved by stochastically perturbing the stored pose in S207 to generate a perturbed pose (e.g., a second pose). Stochastically perturbing the stored pose includes, for example, any combination of slightly offsetting the pose, slightly rotating the pose, slightly enlarging the projected scale of the pose, and slightly reducing the projected scale of the pose. It is noted that a plurality of different perturbed poses (e.g., second poses) can be computed by iterations of step S207.

In S209, a pose confidence is calculated for the perturbed pose based on the image, the perturbed pose and the 3D boundary features, and is an example of a perturbed pose confidence. The perturbed pose confidence is calculated in the same manner as the stored pose confidence in S203.

The perturbed pose confidence is then compared to the stored pose confidence in S211. If the perturbed pose confidence is greater than or equal to the stored pose confidence, meaning that the perturbed pose is closer to the actual pose of the object W, the flow proceeds to refine the stored pose in S213. In addition, if the perturbed pose confidence is greater than or equal to the stored pose confidence, in S211, the perturbed pose can be an example of a pose refined to a relatively intermediate level.

Figure 9:
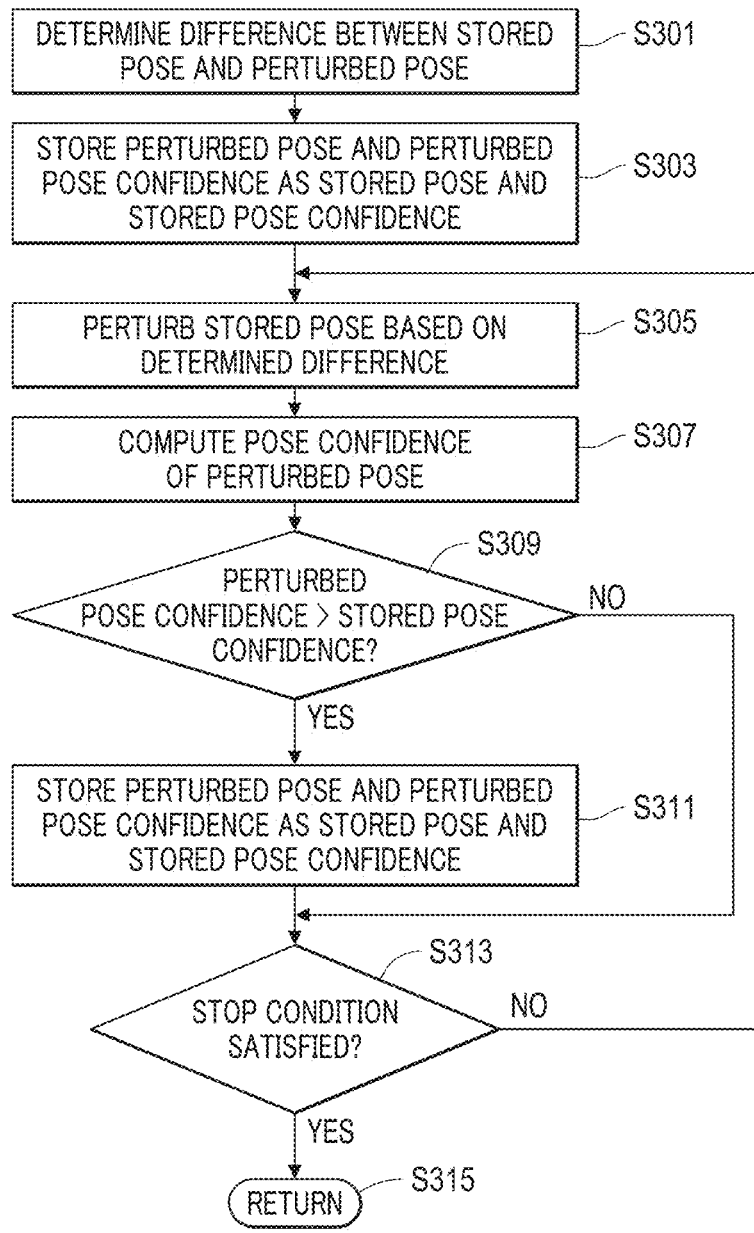
FIG. 9 is a flowchart for refining a pose.

FIG. 9 shows a pose refining process of S213. In S301, a pose difference between the stored pose and the perturbed pose is determined. The pose difference represents the stochastic perturbation carried out in S207.

Next, in S303, the perturbed pose and the perturbed pose confidence are stored as the stored pose and the stored pose confidence. For example, the stored pose and the stored pose confidence can be overwritten with the perturbed pose and the perturbed pose confidence, respectively. Alternatively, the perturbed pose and the perturbed pose confidence can be stored and indicated as the stored pose and the stored pose confidence, respectively.

In S305, the stored pose is perturbed based on the pose difference, and is another example of the perturbed pose. In a first example, if the pose difference indicates a shift in the pose in a first direction, the stored pose can be slightly shifted in the first direction, or slightly shifted in a second direction opposite to the first direction. In a second example, if the pose difference indicates a rotation in a third direction, the pose can be slightly rotated in the third direction, or slightly rotated in a fourth direction opposite to the third direction. It should be noted that the difference can indicate any combination of slightly offsetting the pose, slightly rotating the pose, slightly enlarging the projected scale of the pose, and slightly reducing the projected scale of the pose, and is perturbed in S305 based on the pose difference.

After perturbation of the stored pose in S305, a pose confidence for the perturbed pose is calculated in S307 as another example of a perturbed pose confidence. The perturbed pose confidence is calculated in the same manner as the stored pose confidence in S203.

The perturbed pose confidence is then compared to the stored pose confidence in S309. If the perturbed pose confidence is greater than or equal to the stored pose confidence, meaning that the perturbed pose is closer to the actual pose of the object W, the flow proceeds S311. It should be noted that a plurality of different perturbed poses (e.g., second poses) can be computed by iterations of step S309.

In S311, the perturbed pose and the perturbed pose confidence are stored as the stored pose and the stored pose confidence. For example, the stored pose and the stored pose confidence can be overwritten with the perturbed pose and the perturbed pose confidence, respectively. Alternatively, the perturbed pose and the perturbed pose confidence can be stored and indicated as the stored pose and the stored pose confidence, respectively. Next, the process continues to S313.

If the perturbed pose confidence is less than the stored pose confidence in S309, meaning that the perturbed pose is farther from the actual pose of the object W, the process proceeds to determining if a stop condition is satisfied in S313.

In S313, the process determines whether a stop condition is satisfied. A stop condition can be any combination of, for example, a number of iterations of S311, a number of consecutive times the perturbed pose confidence is less than the stored pose confidence as determined in S309, whether the stored perturbed pose confidence is greater than or equal to a threshold, and a total number of iterations of S305. If the stop condition is satisfied, the process returns to S215 as shown in FIG. 6. If the stop condition is not satisfied, the process returns to S305.

If the perturbed pose confidence is less than the stored pose confidence in S211, meaning that the perturbed pose is farther from the actual pose of the object W, the flow proceeds to determining if a stop condition is satisfied in S215.

In S215, the process determines whether a stop condition is satisfied. A stop condition can be any combination of, for example, a number of iterations of S213, a number of consecutive times the perturbed pose confidence is less than the stored pose confidence as determined in S211, whether the stored perturbed pose confidence is greater than or equal to a threshold, and a total number of iterations of S207. If the stop condition is satisfied, the process outputs the stored pose and the stored pose confidence in S80 as shown in FIG. 3. If the stop condition is not satisfied, the process returns to S207. In addition, when the stop condition is satisfied in S215, the output pose is an example of a pose refined to a relatively fine level.

ALTERNATIVE EMBODIMENTS

Although the control device 40 is illustrated in FIG. 1 as a separate element from robots 1 to 3, the control device 40 can be a component of any combination of robots 1 to 3, or distributed among any combination of the robots 1 to 3.

Although the 3D model contour feature points are described as being extracted by the control device 40 during a training process, it would be would be understood in light of this disclosure that the 3D model contour feature points (e.g., boundary features BF) can be extracted by a remote computer and then transmitted to the control device 40.

Although FIG. 9 and S301 to S313 describe a process for refining the stored pose in S213, alternative methods can be used to refine the stored pose in S213 as would be understood in light of this disclosure.

Moreover, S213 in FIG. 6 and S301 to S313 in FIG. 9 may be omitted from the process in alternative embodiments.

In addition, the present disclosure improves upon the related art by reducing computational costs. By relying on (stochastically) perturbing the pose and outputting the pose in response to the confidence of the perturbed pose, the pose of the object is refined without a significant increase in computational costs. Computational costs are also reduced during training, for example, by rendering a depth map (a 2.5D image) from a 3D model, which is computationally cheaper than rendering a 2D image from the 3D model.

U.S. patent application Ser. No. 15/888,552 describes an exemplary control device, robot, and robot system upon which this disclosure can be implemented. The entire disclosure of U.S. patent application Ser. No. 15/888,552, filed Feb. 5, 2018 is expressly incorporated by reference herein. For the same reason, the entire disclosure of Japanese Patent Application No. 2017-019312, filed Feb. 6, 2017 is expressly incorporated by reference herein.

Although the forgoing description of the method and computer readable medium for pose estimation is in the context of a control device, robot, and robot system, of the method and computer readable medium for pose estimation are described as implemented using an exemplary control device, robot, and robot system, the method and computer readable medium for pose estimation can be implemented in alternative computing environments including a processor, memory, and an imaging device having an RGB-D image sensor. For example, alternative embodiments are, by non-limiting example, a head mounted display, or a personal computer with an imaging device.

As discussed above, the above-mentioned exemplary embodiments of the method and computer readable medium for pose estimation are not limited to the examples and descriptions herein, and may include additional features and modifications as would be within the ordinary skill of a skilled artisan in the art. For example, the alternative or additional aspects of the exemplary embodiments may be combined as well. The foregoing disclosure of the exemplary embodiments has been provided for the purposes of illustration and description. This disclosure is not intended to be exhaustive or to be limited to the precise forms described above. Obviously, many modifications and variations will be apparent to artisans skilled in the art. The embodiments were chosen and described in order to best explain principles and practical applications, thereby enabling others skilled in the art to understand this disclosure for various embodiments and with the various modifications as are suited to the particular use contemplated.

What is claimed is:

1. A method that is performed by one or more processors, comprising:
   (a) receiving an image containing an object, a first pose of the object in the image, and 3D boundary features of a model corresponding to the object;
   (b) computing a first pose confidence of the first pose based on the image, the 3D boundary features, and the first pose;
   (c) stochastically perturbing the first pose to obtain a second pose, the stochastically perturbing of the first pose including at least one of offsetting the first pose, rotating the first pose, enlarging a projected scale of the first pose, and reducing the projected scale of the first pose;
   (d) computing a second pose confidence of the second pose based on the image, the 3D boundary features, and the second pose;
   (e) determining if the second pose confidence is greater than the first pose confidence, refining the second pose if the second pose confidence is greater than the first pose confidence, the refining of the second pose including
      determining a pose difference between the first pose and the second pose, the pose difference indicating at least one of (i) an offset from the first pose to the second pose, (ii) a rotation from the first pose to the second pose, (iii) an enlargement of a scale of the first pose to the second pose, and (iv) a reduction of the scale of the first pose to the second pose, and refining the second pose based on the pose difference; and (f) outputting the refined second pose.

2. The method of claim 1, wherein the computing of the first pose confidence in step (b) includes:

projecting the 3D boundary features onto a 2D space of the image, using the first pose, to obtain first 2D boundary features, generating a first gradient map from the image, for each of the first 2D boundary features, estimating a first edge score for a first area on the first gradient map, the first area being around a location of the first 2D boundary features, and generating the first pose confidence based on the estimated first edge score, and the computing of the second pose confidence in step (d) includes:

projecting the 3D boundary features onto the 2D space of the image, using the second pose, to obtain second 2D boundary features, generating a second gradient map from the image, for each of the second 2D boundary features, estimating a second edge score for a second area on the second gradient map, the second area being around a location of the second 2D boundary features, and generating the second pose confidence based on the estimated second edge score.

3. The method of claim 1, wherein the computing of the first pose confidence in step (b) includes:

projecting the 3D boundary features onto a 2D space of the image, using the first pose, to obtain first 2D boundary features, generating a first gradient map from the image, for each of the first 2D boundary features, estimating a first edge score for a plurality of first areas having different scales on the first gradient map, the plurality of first areas being around a location of the first 2D boundary features, and generating the first pose confidence based on the estimated first edge score, and the computing of the second pose confidence in step (d) includes:

projecting the 3D boundary features onto the 2D space of the image, using the second pose, to obtain second 2D boundary features, generating a second gradient map from the image, for each of the second 2D boundary features, estimating a second edge score for a plurality of second areas having different scales on the second gradient map, the plurality of second areas being around a location of the second 2D boundary features, and generating the second pose confidence based on the estimated second edge score.

4. The method of claim 1, wherein the 3D boundary features include a set of 3D model contour feature points of a 3D model corresponding to the object, and the set of 3D model contour feature points are represented in a three-dimensional coordinate system;

step (b) includes calculating a first set of 2D model contour points by projecting the set of 3D model contour feature points based on the first pose, the first set of 2D model contour points being represented in a two-dimensional coordinate system; and step (d) includes calculating a second set of 2D model contour points by projecting the set of 3D model contour feature points based on the second pose, the second set of 2D model contour points being represented in the two-dimensional coordinate system.

5. The method of claim 4, wherein the first pose confidence is calculated based on a first estimated edge hypothesis in step (b), and the second pose confidence is calculated based on a second estimated edge hypothesis in step (d).

6. A non-transitory computer readable medium that embodies instructions that cause one or more processors to perform object detection, the instructions causing the one or more processors to:

(a) receive an image containing an object, a first pose of the object in the image, and 3D boundary features of a model corresponding to the object;

(b) compute a first pose confidence of the first pose based on the image, the 3D boundary features, and the first pose;

(c) stochastically perturb the first pose to obtain a second pose, the stochastically perturbing of the first pose including at least one of offsetting the first pose, rotating the first pose, enlarging a projected scale of the first pose, and reducing the projected scale of the first pose;

(d) compute a second pose confidence of the second pose based on the image, the 3D boundary features, and the second pose;

(e) determine if the second pose confidence is greater than the first pose confidence, and refine the second pose if the second pose confidence is greater than the first pose confidence by causing the one or more processors to determine a pose difference between the first pose and the second pose, the pose difference indicating at least one of (i) an offset from the first pose to the second pose, (ii) a rotation from the first pose to the second pose, (iii) an enlargement of a scale of the first pose to the second pose, and (iv) a reduction of the scale of the first pose to the second pose, and refine the second pose based on the pose difference; and (f) output the refined second pose.

7. The non-transitory computer readable storage medium of claim 6, wherein the computing of the first pose confidence in step (b) includes:

projecting the 3D boundary features onto a 2D space of the image, using the first pose, to obtain first 2D boundary features, generating a first gradient map from the image, for each of the first 2D boundary features, estimating a first edge score for a first area on the first gradient map, the first area being around a location of the first 2D boundary features, and generating the first pose confidence based on the estimated first edge score, and the computing of the second pose confidence in step (d) includes:

projecting the 3D boundary features onto the 2D space of the image, using the second pose, to obtain second 2D boundary features, generating a second gradient map from the image, for each of the second 2D boundary features, estimating a second edge score for a second area on the second gradient map, the second area being around a location of the second 2D boundary features, and generating the second pose confidence based on the estimated second edge score.

8. The non-transitory computer readable storage medium of claim 6, wherein the computing of the first pose confidence in step (b) includes:

projecting the 3D boundary features onto a 2D space of the image, using the first pose, to obtain first 2D boundary features, generating a first gradient map from the image, for each of the first 2D boundary features, estimating a first edge score for a plurality of first areas having different scales on the first gradient map, the plurality of first areas being around a location of the first 2D boundary features, and generating the first pose confidence based on the estimated first edge score, and the computing of the second pose confidence in step (d) includes:

projecting the 3D boundary features onto the 2D space of the image, using the second pose, to obtain second 2D boundary features, generating a second gradient map from the image, for each of the second 2D boundary features, estimating a second edge score for a plurality of second areas having different scales on the second gradient map, the plurality of second areas being around a location of the second 2D boundary features, and generating the second pose confidence based on the estimated second edge score.

9. The non-transitory computer readable storage medium of claim 6, wherein the 3D boundary features include a set of 3D model contour feature points of a 3D model corresponding to the object, and the set of 3D model contour feature points are represented in a three-dimensional coordinate system;

step (b) includes causing the one or more processors to calculate a first set of 2D model contour points by projecting the set of 3D model contour feature points based on the first pose, the first set of 2D model contour points being represented in a two-dimensional coordinate system; and step (d) includes causing the one or more processors to calculate a second set of 2D model contour points by projecting the set of 3D model contour feature points based on the second pose, the second set of 2D model contour points being represented in the two-dimensional coordinate system.

10. The non-transitory computer readable storage medium of claim 9, wherein the instructions further cause the one or more processors to calculate the first pose confidence based on a first estimated edge hypothesis in step (b) and calculate the second pose confidence based on a second estimated edge hypothesis in step (d).

* * * * *